(12) United States Patent
Murray (10) Patent No.: US 12,498,585 B2
(45) Date of Patent: Dec. 16, 2025

(54) FIVE CHANNEL MULTISPECTRAL LENS

(71) Applicant: Basler AG, Ahrensburg (DE)

(72) Inventor: Neil Murray, Milton Keynes (GB)

(73) Assignee: Basler AG, Ahrensburg (DE)

( * ) Notice: Subject to any disclaimer, the term of this patent is extended or adjusted under 35 U.S.C. 154(b) by 394 days.

(21) Appl. No.: 18/200,846

(22) Filed: May 23, 2023

(65) Prior Publication Data

US 2023/0384606 A1    Nov. 30, 2023

(30) Foreign Application Priority Data

May 24, 2022 (DE) .......................... 102022113139.4

(51) Int. Cl.
| | |
|---|---|
| *G02B 7/02* | (2021.01) |
| *G02B 27/10* | (2006.01) |
| *G03B 11/00* | (2021.01) |

(52) U.S. Cl.
CPC ........... *G02B 27/1066* (2013.01); *G02B 7/02* (2013.01); *G03B 11/00* (2013.01)

(58) Field of Classification Search
CPC ....... G02B 27/1066; G02B 7/02; G03B 11/00
USPC ....................................................... 359/618
See application file for complete search history.

(56) References Cited

U.S. PATENT DOCUMENTS

| | | | |
|---|---|---|---|
| 2015/0373261 A1* | 12/2015 | Rodda ................. | H04N 23/815 348/218.1 |
| 2017/0208257 A1 | 7/2017 | Laroia | |
| 2018/0188523 A1* | 7/2018 | Singh ..................... | H04N 23/57 |
| 2020/0021720 A1* | 1/2020 | Wang ..................... | H04N 23/90 |
| 2020/0314308 A1* | 10/2020 | Narayanswamy ..... | H04N 23/57 |
| 2021/0255113 A1* | 8/2021 | Kester ................... | H04N 7/181 |
| 2021/0377427 A1* | 12/2021 | Wang ..................... | H04N 23/45 |

OTHER PUBLICATIONS

Communication from the German Patent Office dated Feb. 7, 2023 for corresponding German App. No. 10 2022 113 139.4 filed May 24, 2022.

* cited by examiner

*Primary Examiner* — William R Alexander
(74) *Attorney, Agent, or Firm* — REISING ETHINGTON, P.C.

(57) ABSTRACT

A camera objective having a housing extending along a central longitudinal axis between first and second end faces and a partition element located in the housing. The housing has a light inlet opening on the first end face and a light outlet opening on the second end face. A plurality of apertures are formed through the partition element along a central axis that is parallel to or coincides with the central longitudinal axis of the housing. An associated optical filter and lens are arranged on each aperture to form an optical package. One of the optical packages is formed as a primary optical package having a first focal length, and the remaining optical packages are formed as secondary optical packages having a second focal length that is less than the first focal length.

40 Claims, 6 Drawing Sheets

FIVE CHANNEL MULTISPECTRAL LENS

CROSS-REFERENCE TO RELATED APPLICATIONS

This application claims the benefit and priority of German Patent Application No. 10 2022 113 139.4 filed May 24, 2022, the disclosure of which is incorporated herein by reference.

FIELD

The present disclosure generally relates to a multi-channel multispectral lens. More specifically, the present disclosure relates to an objective for a camera comprising a housing extending along a central longitudinal axis between a first end face and an opposite second end face and a partition element located in the housing wherein the partition element comprises a plurality of partition openings each configured as an aperture and wherein an associated optical filter is arranged on each aperture, for example in front of each aperture, and an associated lens is arranged on each aperture, for example behind each aperture, such that for each aperture an optical package is formed by the associated optical filter, the respective aperture, and the associated lens. Further, the present invention relates to a camera system comprising a camera and an objective having a plurality of optical packages.

BACKGROUND

This section provides background information related to the present disclosure which is not necessarily prior art.

From the prior art camera systems having an objective with a plurality of optical packages, i.e., a plurality of combinations of a specific filter and a lens, are known wherein each optical package produces a separate image of an object on an image pickup device of the camera system such as a two-dimensional sensor which is arranged in a common image or focal plane of the lenses of the respective optical packages. Such camera system allows to take a plurality of images of an object with the light coming from the object passing through different types of filters at the same time so that the different images can be analyzed in parallel and by comparing the different images additional information about the object may be gained. In particular, the fact that the plurality of images are obtained in parallel such camera systems allow for a real-time analysis of the respective images and, hence, results may be obtained very rapidly. In addition, artefacts caused by a movement of the objects during taking the plurality of pictures are avoided, too.

In particular, such systems are often used to determine the Normalized Difference Vegetation Index. In this case it is made use of the fact that plants absorb radiation in the photosynthetically active region of the spectrum, i.e., in the range between 600 and 700 nm, whereas in the near infrared region a large portion of the light is reflected. By determining in satellite images the ratio between the intensities of light being reflected in these two different regions of the spectrum it can be assessed to which extent a certain region in the image is dominated by plants and vegetation.

Furthermore, in devices for separating plastic materials images in different regions of the electromagnetic spectrum of the items to be separated are taken in parallel and based on the ratio of the intensities of the different images it is determined out of which specific plastic material a certain item is formed. To this end the images of the items in question in the different regions of the spectrum are taken in parallel so that also a camera system as described above is employed.

However, in any of these applications as well as in other applications not discussed above, it is crucial that in the camera systems employed the optical aberrations in the images produced by the different optical packages due to misalignment between the packages and the image pickup device are minimized. This ensures that across the entire pictures a precise analysis of the data obtained may be performed.

Moreover, in prior systems with a plurality of optical packages, problems arise because the optical axes of the packages are spaced from each to such a large extent that the parallax for different optical packages results in mismatches when combining pictures of the two different packages.

In addition, it is often desirable that at least one of the images taken has a higher spatial resolution than the other images. Therefore, it is also desirable that the camera system is configured such that at least one of the images generated on the image pickup device has an increased spatial resolution compared to the other images taken in parallel.

Therefore, it is the object of the present disclosure to provide an objective and a camera system as described above being capable of obtaining a plurality of images on the image pickup device with small aberrations and the desired spatial resolution.

SUMMARY

This section provides a general summary of the disclosure, and is not a comprehensive disclosure of its full scope or all of its features.

According to a first aspect of the present disclosure this object is achieved by an objective for a camera, comprising:
  a housing extending along a central longitudinal axis between a first end face and an opposite second end face and
  a partition element located in the housing,
  wherein the housing has a light inlet opening on the first end face and a light outlet opening on the second end face,
  wherein the partition element comprises a plurality of partition openings each configured as an aperture and each extending through the partition element along a central axis which is parallel to or coincides with the central longitudinal axis of the housing,
  wherein an associated optical filter is arranged on each aperture, for example in front of each aperture, and an associated lens is arranged on each aperture, for example behind each aperture, such that for each aperture an optical package is formed by the associated optical filter, the respective aperture, and the associated lens,
  wherein one of the optical packages is formed as a primary optical package and the remaining optical packages are formed as secondary optical packages, and
  wherein the lens of the primary optical package referred to as the primary lens has a greater focal length than each of the lenses of the secondary optical packages referred to as the secondary lenses.

Thus, according to the first aspect of the present disclosure an objective for a camera is provided which comprises a housing that extends along a central longitudinal axis between a first end face and an opposite second end face.

The housing defines a longitudinal axis and comprises first and second end faces which can extend perpendicularly to the central longitudinal axis and are spaced from each other. The housing comprises a light inlet opening on the first end face and a light outlet opening on the second end face. In particular, the second end face and the light outlet opening are configured such that a camera comprising an image pickup device arranged in an image plane may be coupled to the second end face comprising the light outlet opening. However, it is to be noted that the end faces and the respective opening do not need to extend in the same plane but may be offset along the central longitudinal axis defined by the housing. In particular, it is to be noted that the end faces may not be planar but may have a stepped shape and/or may have a recessed section with the inlet or outlet openings being in the recessed section. Further, the openings may be offset from the end faces along the longitudinal axis of the housing. The image pickup device of the camera may be configured such that it photoelectrically converts infrared light, visible light or light of shorter wavelength into an electrical signal that can be processed further, e.g., it may be formed as a CCD, CMOS or as InGaAs image sensor However, the present disclosure is not limited to such image pickup devices. Instead, any other planar image pickup device may be employed in a camera that may be coupled to the objective of the present disclosure.

Further, the housing is provided with a partition element that comprises a plurality of partition openings each formed as an aperture, that extends through the partition element along a central axis, which coincides with or extends parallel to the central longitudinal axis. An associated lens is arranged on each aperture, for example behind each aperture when seen from the first end face and the light inlet opening, respectively. In particular, the lenses may be configured such, that the focal length of the lenses is chosen in such a way that the focal points of each of the lenses are positioned in a common focal plane. When the objective of the present disclosure is coupled to a camera, the focal plane of the lenses coincides with the image plane of the camera in which the image pickup device is located. In this regard it is to be noted that a lens in the sense of the present disclosure may also encompass a group of lenses being combined, e.g., by attaching them to each other. Hence, the term lens in the sense of the present disclosure is not limited to a sole lens.

In addition, in the objective of the present disclosure, the distance between the optical axes of the lenses of the optical packages measured in a plane perpendicular to these axes is relatively small, so that mismatches of pictures taken with different optical packages due to the parallax are minimised.

The primary lens of the primary optical package can be configured such that it produces a primary image in a focal plane and each of the secondary lenses of the secondary packages are configured such that they also produce an associated secondary image in the same focal plane.

Furthermore, the lenses are configured and arranged such that each lens produces an image of an object in front of the objective in the focal plane wherein the images are arranged adjacent to each other so that each lens generates an image that is located at a position in the focal plane different to the images from the other lenses, i.e., the images may be arranged adjacent to each other. In particular, in this way, it is possible that an image pickup device arranged in the focal plane may separately pick up the plurality of images generated by the plurality of lenses provided in the partition element.

In addition, each aperture is provided with an associated optical filter, which can be positioned in front of each aperture when seen from the first end face and the light inlet opening, respectively. The optical filters can be configured such that they have different transmission characteristics, i.e., the center wavelength and the bandwidth of the transmissive light may vary for different filters of the objective of the present disclosure. In addition, it is also conceivable that the filters are configured such that they modify characteristics of the light passing through them in a different manner such as the polarization or intensity of the light being transmitted in relation to the incident light. In particular, the filters may include at least two filters that are mutually different with respect to the filter characteristics. However, it is also conceivable, that for any pair of filters the filter characteristics are different.

Furthermore, it is to be noted that a filter in the sense of the present disclosure may be formed by several individual filter elements being combined to the filter, e.g., the filter elements may be stacked one above the other or otherwise combined so as to form the respective filter having the required transmission characteristics.

For each aperture an optical package is formed by the aperture, the associated optical filter and the associate lens. One of the optical packages is formed as a primary optical package whereas the remaining optical packages are formed as secondary optical packages. The lens of the primary optical package, i.e., the primary lens, has a greater focal length than each of the lenses of the secondary optical packages, i.e., the secondary lenses.

Hence, the objective of the present disclosure comprises at least one optical package, namely the primary optical package the lens of which has a longer focal length even though its focal point is still positioned in the common focal plane of the lenses of both the primary optical package and the secondary optical packages, so that the image produced by the primary optical package has a higher spatial resolution than the images generated by the secondary optical packages.

The partition element can include for each optical package an associated filter seat in which the filter of the respective optical package is seated and/or retained. In particular, the partition element forms each of the filter seats. Further, each filter seat can be designed as a circumferential step projecting into the partition element. With such arrangement the optical filters may precisely be positioned in the partition element. In particular, a circumferential step provides for a reliable support of the respective filter elements in a predetermined position.

In a further embodiment, the objective comprises for the primary optical package an associated primary cover element, which is placed on the first end face of the partition element, wherein the primary cover element comprises a primary funnel opening, which is coaxially aligned with the optical filter, aperture and/or lens of the primary optical package. Such primary cover element having a primary funnel opening the cross section of which can be larger than the cross section of the aperture of the primary optical package but smaller than the cross section of the filter of the primary package, prevents unfiltered light from passing through the primary lens and reaching the image pickup device but does not reduce the overall intensity of light reaching the image pickup device. This in turn ensures an undisturbed signal generated by the image pickup device from the image generated by the primary optical package.

Similarly, in a further embodiment the objective can include for the secondary optical packages an associated secondary cover element, which is placed on the first end face of the partition element, wherein the secondary cover element comprises for each secondary optical package an associated secondary funnel opening, which is coaxially aligned with the optical filter, aperture and/or lens of the respective secondary optical package. In particular, in case such secondary cover element has secondary funnel openings the cross sections of which may each be larger than the cross section of the aperture of the associated secondary optical package but smaller than the cross section of the filter of the associated package, also prevents unfiltered light from passing through the secondary lenses and reaching the image pickup device. However, the overall intensity of light reaching the image pickup device is not reduced either. This also ensures that an undisturbed signal may be generated by an image pickup device from the images generated by the secondary optical packages, since the funnel openings, which can have a cross-section larger than the aperture of the associated secondary package but smaller than the filter, prevents light from passing through the respective lens without having also passed the filter.

The partition element can include for each optical package an associated lens seat in which the lens of the respective optical package is seated and/or retained. In situations where the partition element forms each of the lens seats, the lens seats can be designed as a circumferential step projecting into the partition element. With such arrangement the lenses may precisely be positioned within the partition element, which in turn reduces the risk of aberrations in the image produced by the optical packages.

The objective can include an entrance glass or entrance lens, which may further be adapted to focus light entering the objective on turn the lenses of the optical packages.

The central axis of the aperture of the primary optical package and the central optical axis of the primary lens of the primary optical package can be aligned coaxially to define a primary longitudinal axis associated with the primary optical package. In particular, when the primary optical package is centrally arranged in the partition element with the central longitudinal axis and the primary longitudinal axis coincide, the vignetting effects in the image generated by the primary optical package are reduced to a maximum extent. In addition, in case the objective comprises an entrance lens arranged in front of the optical packages such central arrangement of the primary package achieves that light generating the picture of the primary optical package passes through the central portion of the entrance lens which further improves the quality of the picture of the primary optical package.

However, it is also conceivable that a primary longitudinal axis of the primary optical package is defined by a central optical axis of the primary lens of the primary optical package, wherein the central axis of the aperture of the primary optical package is offset from the primary longitudinal axis, preferably offset from the primary longitudinal axis by a predetermined first distance measured in a plane perpendicular to the central longitudinal axis of the housing. Such configuration can be advantageous, for example when the primary optical package is not centrally arranged within the partition element, i.e., the primary longitudinal axis does not coincide with the central longitudinal axis of the objective. Such asymmetric arrangement ensures in the case where the primary optical package is not centrally arranged that the vignetting effects are minimized.

When for each secondary optical package an associated secondary longitudinal axis is defined by a central optical axis of the secondary lens of the secondary optical package, for at least one of the secondary optical packages a central axis of the aperture of the at least one secondary optical package can be offset from the associated secondary longitudinal axis of the at least one secondary optical package, for example offset from the secondary longitudinal axis by a predetermined second distance measured in a plane perpendicular to the central longitudinal axis of the housing. In particular, when for each of the secondary optical packages the secondary longitudinal axis is offset from the central longitudinal axis, such offset arrangement of the aperture of the secondary optical packages minimizes the vignetting effects. Especially, when the central axis of the aperture is offset towards the central longitudinal axis relative to the secondary longitudinal axis, this effect is achieved. This is because light passing through the respective lens and generating the respective image on the image pickup device has a reduced probability to be scattered on the inner edge of the aperture.

For each secondary optical package, an associated secondary longitudinal axis can be defined by a central optical axis of the secondary lens of the secondary optical package, wherein for each of the secondary optical packages the secondary longitudinal axis can be offset from the central longitudinal axis, i.e., in such embodiment the secondary optical packages can be each laterally offset from the central longitudinal axis and may optionally surround the primary optical package.

In a further embodiment, the objective can include at least three partition openings, preferably at least four partition openings, and more preferably at least five partition openings.

In another embodiment, at least two of the partition openings, i.e., apertures of optical packages, have different sizes, in particular different diameter sizes or different open areas. This allows to adapt the size of the partition openings and hence the apertures to the filter characteristics of the optical package associated with the respective opening and aperture, respectively. In particular, depending on the filter characteristics and in particular the center wavelength and the bandwidth of transmissive light the size of the opening or aperture may be adapted so as to prevent or reduce vignetting effects. In particular, the aspect ratio of the openings or apertures corresponds to the aspect ratio of the region of the image pickup device where the associated picture is taken. This ensures that vignetting effects are further reduced.

Each of the partition openings can have a rectangular open area shape, i.e., the openings are rectangular rather than being circular. Such rectangular arrangement has the above-described advantage that the vignetting effects are minimized and an astigmatism resulting from the rectangular shape is accepted. In addition, the focal length of the lenses of the secondary optical packages may be equal or identical or alternatively may differ. In addition, the lenses of the secondary optical packages may have at least two different focal lengths, i.e., at least two different types of lenses are used in the secondary optical packages. In any case, the lenses of the secondary optical packages are arranged such that their focal points are located in a common focal plane extending perpendicularly to the central longitudinal axis.

The secondary filters may be formed as long pass or short pass filters. Alternatively, each of the secondary filters can be formed as a narrow band filter having a bandwidth of at most 100 nm, preferably at most 70 nm, more preferably at most 50 nm, most preferably at most 30 nm.

Further, the primary filter may also be formed as long pass or short pass filters. The primary filter can be designed as a broadband filter, for example having a bandwidth of at most 600 nm, or as a narrowband filter, for example having a bandwidth of at most 100 nm, preferably at most 70 nm, more preferably at most 50 nm, still more preferably at most 30 nm.

In addition, the transmission wavelength ranges of the secondary filters may be different from each other, for example at least overlappingly different from each other, i.e., the wavelength ranges are different but overlap, or may be distinctly different from each other, i.e., the wavelength ranges even do not overlap.

Particular examples for band filters to be used as primary or secondary filters are the following:

| Central Wavelength [nm] | Bandwidth [nm] |
|---|---|
| 480 | 27 |
| 610 | 20 |
| 540 | 18 |
| 660 | 20 |
| 840 | 40 |
| 660 | 20 |
| 760 | 20 |
| 550 | 100 |
| 930 | 50 |
| 840 | 40 |

In addition, the transmission wavelength range of the primary filter can be different from any of the secondary filters, for example at least overlappingly different, or distinctly different from the transmission wavelength ranges of any of the secondary filters. Hence, the image taken with the primary optical package and having an increased spatial resolution compared to the images taken by the secondary optical packages.

In another embodiment, the partition element can include an upstanding portion that protrudes towards the first end face, wherein the aperture of the primary package is formed in the upstanding portion of the partition element. With such arrangement it is ensured that both the filter and the lens of the primary optical package are arranged at a greater distance from the common focal plane so that the focal length of the lens of the primary optical package is larger than the focal length of the lens of the other secondary optical packages.

In another embodiment, the partition element has a number of partition sections corresponding to the number of optical packages, wherein in each of the partition sections exactly one of the partition openings is formed, so that exactly one of the optical packages is assigned to each of the partition sections, wherein the partition section associated with the primary optical package is designated as the primary partition section and the remaining partition sections are designated as the secondary partition sections, and wherein the primary partition section is arranged offset from the secondary partition sections along the central longitudinal axis towards the light inlet opening. With such arrangement it is obtained that the primary optical package is located at a position where it has a larger distance to the focal plane compared to the secondary optical packages. Hence, the requirement that the focal length of the primary lens is greater than the focal length of any of the secondary lenses can easily be achieved.

The primary partition section can have a base area perpendicular to the central longitudinal axis, referred to as a primary base area, that can be at least 1.5 times, preferably at least 2 times, more preferably at least 2.5 times, as large as an average base area of the secondary partition sections. Such arrangement allows for the primary lens to have a larger cross-section or larger dimensions which further increases the spatial resolution of the image generated by the primary optical package.

Optionally, the secondary partition sections can be arranged without gaps to each other. This allows for a tight arrangement of the secondary optical packages and, hence, a compact design of the objective of the present disclosure.

The primary partition section can be arranged in the center of the partition element, and may optionally be aligned with the central longitudinal axis.

In order to obtain a space-saving and symmetrical arrangement, the primary partition section can be rectangular in shape, and an equal number of secondary partition sections can be respectively arranged to opposite lateral sides of the primary partition section.

In another embodiment standing walls are formed on the rear side of the partition element facing the light outlet opening, wherein the standing walls extend along the boundaries between the partition sections. Such arrangement prevents that light having passed one of the optical packages is scattered such that it interferes with light from another optical package. Thus, such arrangement ensures that a first optical package generates an image without disturbance from other optical packages. The standing walls can be formed by the partition element and in may be integrally formed with the partition element.

The standing walls can extend parallel to the central longitudinal axis to form an associated chamber for each optical package, and each chamber can extend from the associated aperture to the light outlet opening. Such arrangement effectively prevents scattered light from one optical package to interfere with light of another optical package.

Furthermore, the primary and secondary lenses can be configured such that an area of a primary image, generated by the primary optical package and referred to as a primary image area, is at least 1.5 times, preferably at least 2 times, more preferably at least 2.5 times, as large as an average area of the secondary image generated by the secondary optical packages.

In another embodiment the primary partition section and the secondary partition sections may be formed integrally with the partition element or as separate partition covers. When the primary partition section and the secondary partition sections are formed as separate partition covers, fastening means may be provided for fastening the partition covers to the partition element. This is advantageous as the partition sections formed as partition covers can be exchanged and/or replaced in a very simple manner. Furthermore, it is advantageous that the partition covers can vary in shape, e.g. the shape of the aperture, so that the partition element can have varying partition covers for the respective secondary partition sections without having to replace the entire partition element. The secondary partition sections may thereby provide its own partition cover for each of the second optical packages. It may also be provided that a partition cover is provided for a plurality of the optical packets, wherein in that case the partition cover provides separate apertures for each of the optical packets.

In a second aspect of the present disclosure, the above object is achieved by a camera system, comprising:
a camera, and
an objective according to one or more of the aforementioned embodiments,
wherein the objective is attached to the camera, in particular detachably, and wherein the camera has an image pickup device, preferably a sensor, disposed in the image plane of the lenses of the objective.

The camera system of the present disclosure can have the same advantages as discussed in relation to the objective of the present disclosure.

Moreover, it is preferred that an area of a primary image, generated by the primary optical package and referred to as a primary image area, is at least 1.5 times, preferably at least 2 times, more preferably at least 2.5 times, as large as an average area of the secondary image generated by the secondary optical packages, so that the resolution of the primary image is at least 1.5 times, 2 times or 2.5 times of an average resolution of the secondary images.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
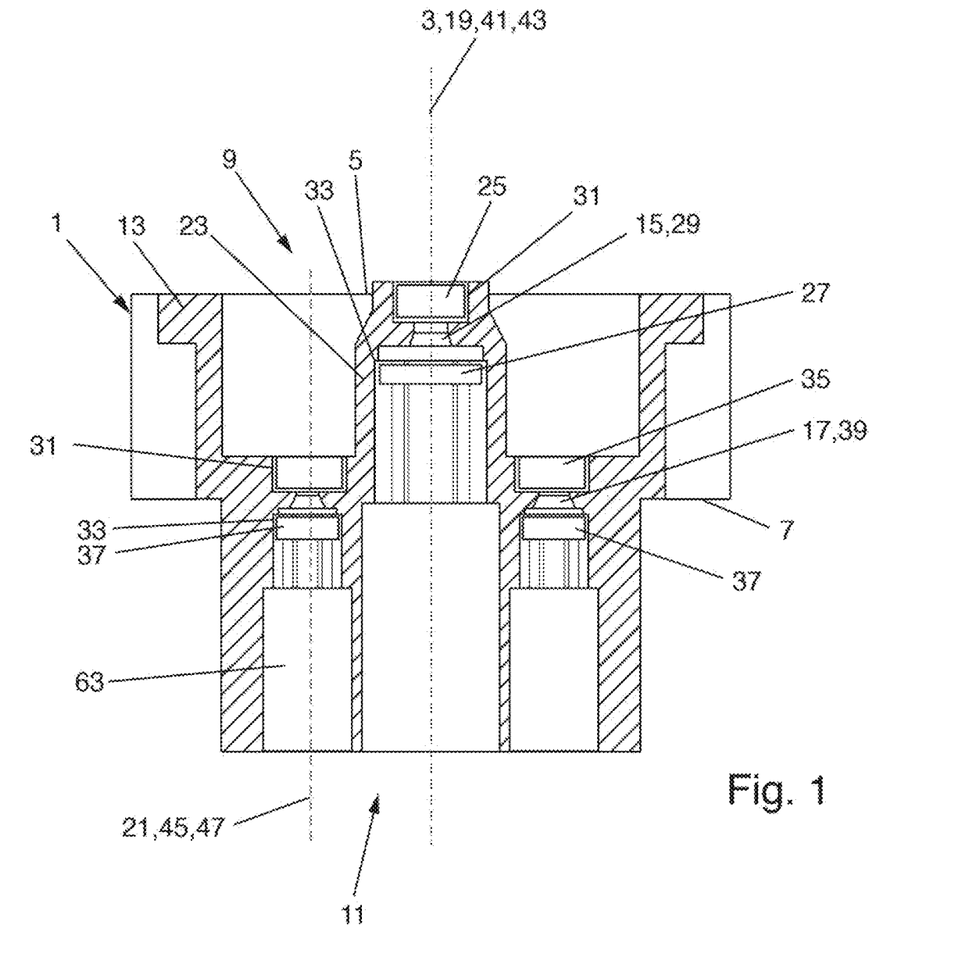
FIG. 1 shows a longitudinal cross-sectional view of a first embodiment constructed in accordance with the teachings of the present disclosure.
Figure 2:
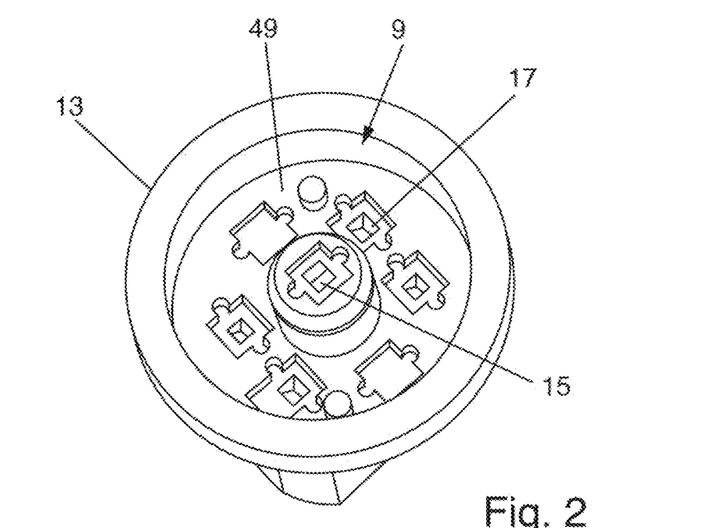
FIG. 2 shows a perspective front view of the partition element of the embodiment of FIG. 1.

With reference to FIG. 1 an exemplary embodiment constructed in accordance with the teachings of the present disclosure comprises a housing 1 which extends along a central longitudinal axis 3 between a first end face 5 and an opposite second end face 7, the end faces 5, 7 extending perpendicularly to the central longitudinal axis 3. As can further be taken from FIG. 1, the housing 1 has a light inlet opening 9 formed on the first end face 5 and a light outlet opening 11 formed on the second end face 7. It is to be noted that generally the end faces 5, 7 may not be planar but may have a stepped shape and/or may have a recessed section with the inlet or outlet openings 9, 11 being in the recessed section. Further, the openings 9, 11 may be offset from the end faces 5, 7 along the longitudinal axis 3 of the housing 1.

Within the housing 1 a partition element 13 is received which also extends along the central longitudinal axis 3 from the first end face 5 beyond the second end face 7 so that the light inlet opening 9 is formed in the same plane as the first end face 5, whereas the light outlet opening 11 is formed on the second end face 7 but offset along the central longitudinal axis 3 beyond the second end face 7 instead of being in the same plane as the second end face 7.

As can be further seen in FIG. 1, the partition element 13 comprises a plurality of partition openings each configured as an aperture 15, 17 and each extending through the partition element 13 along a central axis 19, 21 which is parallel to or coincides with the central longitudinal axis 3 of the housing 1. In particular, the partition element 13 extends essentially in a plane perpendicular to the central longitudinal axis 3 and comprises a centrally arranged upstanding portion 23 that protrudes along the central longitudinal axis 3 towards the first end face 5. In this upstanding portion 23 a centrally arranged aperture 15 is provided. Furthermore, the partition element 13 comprises further apertures 17 which surround the centrally arranged aperture 15 so that in the present embodiment five apertures 15, 17 are provided in the partition element 13 (see also FIG. 4).

On the aperture 15 in the upstanding portion 23 an optical filter 25 is arranged which can be located on that side of the aperture 15 which points towards the light inlet opening 9 and, hence, is arranged in front of the aperture 15. In addition, behind the aperture 15 in the upstanding portion 23 a primary lens 27 is positioned. The optical filter 25, the aperture 15, and that the primary lens 27 together form a primary optical package 29.

To this end the upstanding portion 23 comprises for the primary optical package 29 in front of the aperture 15 an associated filter seat 31 in which the filter 25 of the primary optical package 29 is seated and retained, the filter seat 31 being integrally formed in the partition element 13 and formed as a circumferential step projecting into the partition element 13. Similarly, the partition element 13 also comprises behind the aperture 15 another integrally formed circumferential step projecting into the partition element 13 which forms a lens seat 33 and retains the primary lens 27.

On each of the apertures 17 arranged around the centrally arranged aperture 15 and, hence, the primary optical package 29, a further optical filter 35 is arranged in front of the respective aperture 17, i.e., it is arranged on that side of the respective aperture 17 which points towards the light inlet opening 9. Furthermore, behind each of these apertures 17, i.e., on the side facing towards the light outlet opening 11, a secondary lens 37 is arranged. Each of the combinations of these apertures 17 and the associated optical filter 35 and the associated secondary lens 37 form together a secondary optical package 39. Furthermore, each of the secondary optical packages 39 comprises a filter seat 31 and a lens seat 33 which are formed in the same manner as the respective seats of the primary optical package 29. In particular these seats 31, 33 may also be formed as step projecting into the partition element 13 so that these seats 33 are integrally formed with the partition element 13.

Thus, in the particular embodiment illustrated the primary optical package 29 is arranged such that the primary longitudinal axis 41 of the primary optical package 29 which is defined by the central optical axis 43 of the primary lens 27 coincides with the central longitudinal axis 3. In addition, the center optical axis 43 and the central axis 19 of the aperture 15 of the primary optical package 29 also coincide.

However, it is also conceivable that the central axis 19 of the aperture 15 of the primary optical package is offset relative to the central optical axis 43 and, hence, the primary longitudinal axis 41. In particular, such arrangement may be chosen when the primary longitudinal axis 41 does not coincide with the central longitudinal axis 3 defined by the housing 1.

The secondary longitudinal axes 45 of the secondary optical packages 39 are offset and off-center relative to the central longitudinal axis 3. The secondary longitudinal axis 45 of a secondary optical package 39 is defined by the central optical axis 47 of the secondary lens 37.

Figure 6:
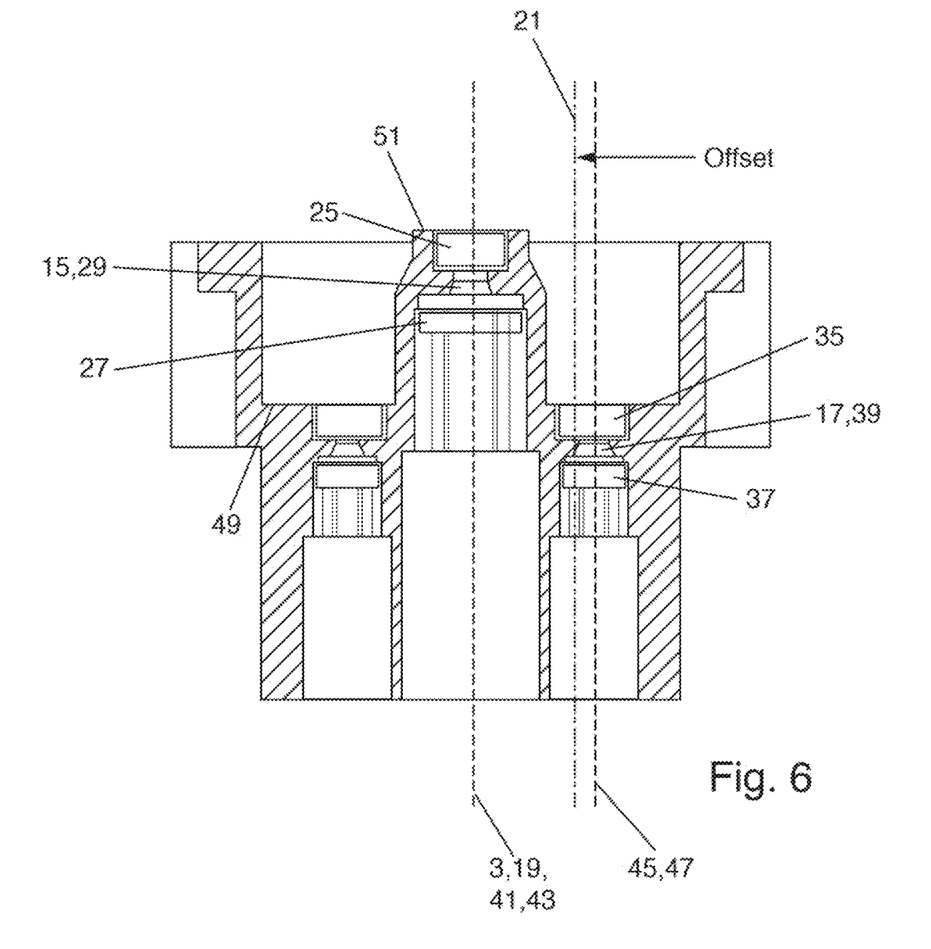
FIG. 6 shows another longitudinal cross-sectional view of the embodiment of FIG. 1.

As schematically indicated in FIG. 6, the central optical axis 47 and, hence, the secondary longitudinal axis 45 may be offset relative to the central axis 21 of the aperture 17 of a secondary optical package 39. Thus, in the secondary optical packages 39 the central axis of the aperture 17 and the central optical axis of the respective secondary lens 37 are not necessarily aligned with each other. In particular, a certain offset perpendicular to central longitudinal axis 3 can exist, which will be discussed in the following with reference to the FIGS. 1, 6, and 7.

Figure 7:
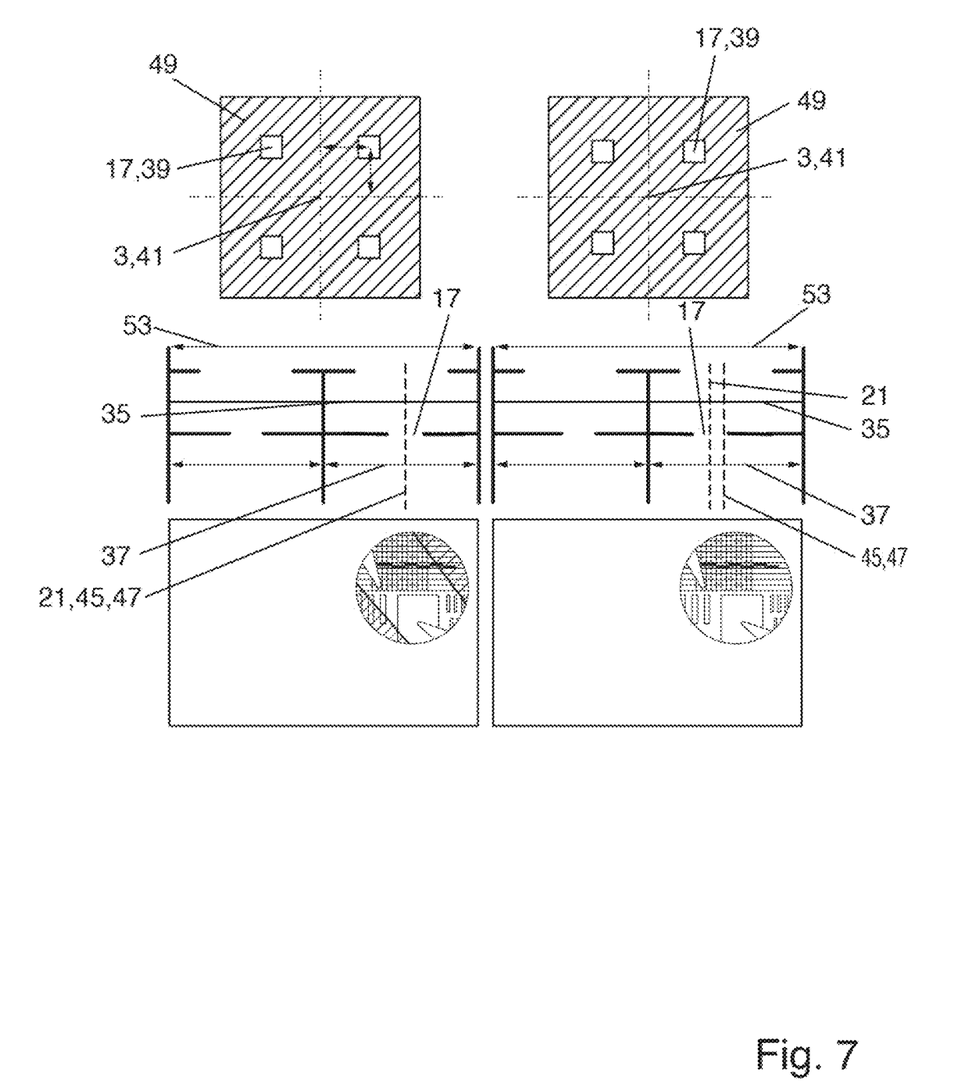
FIG. 7 schematically shows the positioning of the apertures of the secondary optical packages of the embodiment of FIG. 1.

FIG. 7 schematically shows the comparison between an arrangement where the aperture 17 of the secondary optical packages 39 is arranged such that the central axis 21 of the respective aperture 17 coincides with the central optical axis 47 defined by the secondary lens 37 of the respective secondary optical package 39 (left part of FIG. 7) with the case where the central axis 21 and the central optical axis 47 are offset relative to each other (right part of FIG. 7).

In the upper part of FIG. 7 it can schematically be seen that the partition element 13 comprises a plurality of secondary partition sections 49 the number of which corresponds to the number of apertures 17 of the secondary optical packages 39 provided in the partition element 13. In each secondary partition section 49 only one aperture 17 is provided, and the secondary partition sections 49 have a rectangular shape and are arranged adjacent to each other so that lateral sides or edges abut and there is no gap between adjacent secondary partition sections 49.

Figure 4:
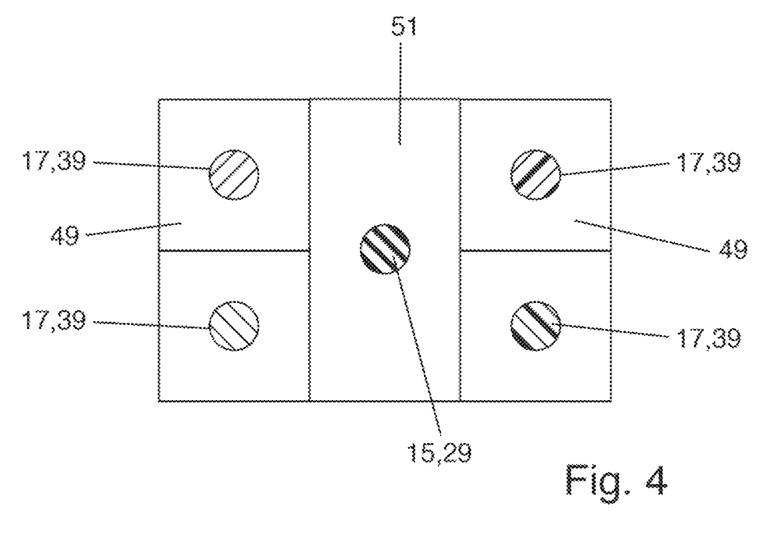
FIG. 4 shows a schematic view of the arrangement of primary and secondary optical packages of the embodiment of FIG. 1.

Furthermore, as shown in FIG. 4 the partition element 13 also comprises a primary partition section 51 which is not shown in FIG. 7, is arranged in the center of the partition element 13 being aligned with the central longitudinal axis 3 and in which only the aperture 15 of the primary optical package 29 is located. Further, the primary partition section 51 extends perpendicularly to the central longitudinal axis 3 and is offset from the secondary partition sections 49 along the central longitudinal axis 3 towards the light inlet opening 9. As can be derived from FIG. 4, the base area perpendicular to the central longitudinal axis 3 of the primary partition section 51 can be at least 1.5 times larger than an average base area of the secondary partition sections 49. However, it is also conceivable that the base area of the primary partition section 51 is even larger, such as 2 times or 2.5 times the average base area of the secondary partition sections 49.

The primary partition section 51 and the secondary partition sections 49 may be formed integrally with the partition element 13 or as separate partition covers. When the primary partition section 51 and the secondary partition sections 49 are formed as separate partition covers, fastening means may be provided for fastening the partition covers to the partition element 13. This is advantageous as the partition sections 49, 51 formed as partition covers can be exchanged and/or replaced in a very simple manner. Furthermore, it is advantageous that the partition covers can vary in shape, e.g. the shape of the aperture 17, so that the partition element can have varying partition covers for the respective secondary partition sections 49 without having to replace the entire partition element 13. The secondary partition sections 49 may thereby provide its own partition cover for each of the second optical packages 39. It may also be provided that a partition cover is provided for a plurality of the optical packets 39, wherein in that case the partition cover provides separate apertures 17 for each of the optical packets 39.

As can be taken from right part of FIG. 7, the central axis 21 of the aperture 17 of the secondary optical packages 39 can be offset from the secondary longitudinal axis 45 of the respective secondary optical package 39 by a predetermined distance towards the central longitudinal axis 3 measured in a plane perpendicular to the central longitudinal axis 3 of the housing 1, i.e., the central axis 21 of the respective aperture 17 has a smaller distance to the central longitudinal axis 3 then the respective central optical axis 47 and secondary longitudinal axis 45 of that secondary optical package 39. The central axis 21 and, hence, the aperture 17 are not centered relative to the associated secondary lens 37. Such off-center arrangement of the aperture 17 relative to the associated secondary lens 37 is shown in the right part of the FIG. 7.

In the bottom portion of FIG. 7 the advantageous result of the off-center arrangement of the aperture 17 of the secondary optical packages 39 effect is shown. Whereas in case where the central axis 21 of the aperture 17 coincides with the central optical axis 47 (rear left part of FIG. 7) vignetting effects can be observed in the periphery of the image generated by that secondary optical package 39, whereas this is not the case where the central axis 21 is offset towards the central longitudinal axis 3 relative to the secondary longitudinal axis 45 (see right part of FIG. 7). Such off-center arrangement of the aperture 17 relative to the secondary lens 37 can be chosen for each secondary optical package 39.

Moreover, it can also be seen in FIGS. 1 and 6, that for each secondary optical package 39 the secondary longitudinal axis 45 is offset relative to the central longitudinal axis 3. In particular, the secondary optical packages 39 and the associated secondary partition sections 49 surround the primary optical package 21 and the associated primary partition section 51, as can be seen in FIG. 4.

The lenses 27, 37 of the first and second optical packages 29, 39 are configured such that they generate an image in a common focal plane (not shown). Hence, since the primary lens 27 of the primary optical package 29 has a larger distance to the focal plane than the secondary lenses 37 of the secondary optical package 39 but also generates an image in the focal plane, the primary lens 27 has a longer focal length than each of the secondary lenses 37 of the secondary optical packages 39. In addition, as can be derived from FIGS. 1 and 6 the secondary lenses 27 are arranged in a common plane so that the focal lengths of the secondary lenses 27 of the secondary optical packages are equal. However, it is also conceivable that different from such design the secondary lenses 27 of the secondary optical 39 packages comprise at least two different focal lengths.

The partition openings and, hence, the apertures 15, 17 may have different sizes, in particular different diameter sizes or different open areas, so as to adapt the intensity of the light reaching the focal plane in which the lens 27, 37 each generate an image. Further, each of the apertures 15, 17 may have a rectangular open area shape.

Figure 5:
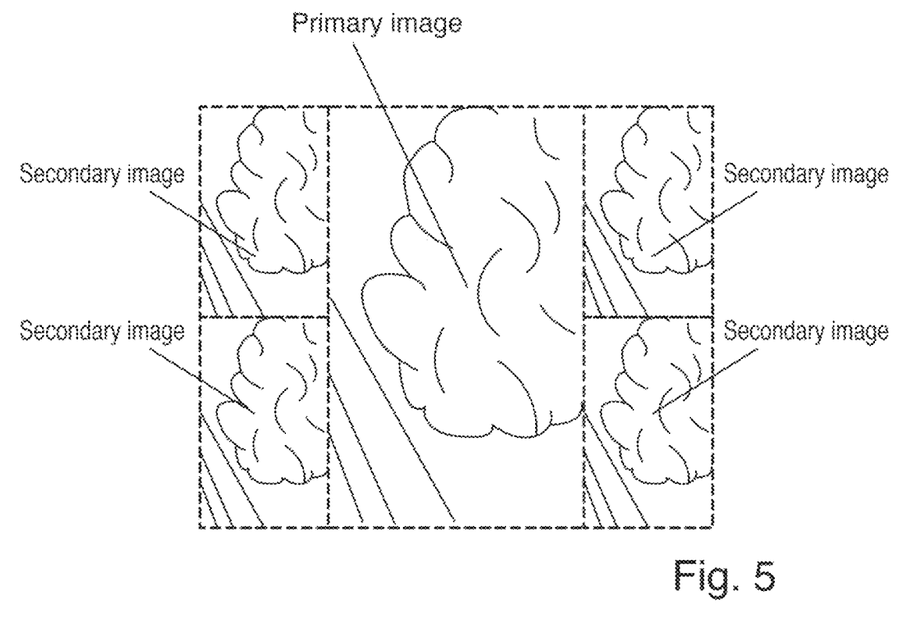
FIG. 5 shows an example of the combination of images taken with the embodiment of an objective of the present disclosure of FIG. 1.

The primary lens 27 of the primary optical package 29 is configured such that it produces a primary image in the common focal plane (see FIG. 5). Further, each of the secondary lenses 37 of the secondary optical packages 39 are also configured such that they produce an associated secondary image in the focal plane. Moreover, an area of the primary image is at least 1.5 times, preferably at least 2 times, more preferably at least 2.5 times, as large as an average area of the secondary images. Thus, the primary image is significantly larger than that of the secondary images. In addition, due to the larger focal length of the primary lens 27 the spatial resolution of the primary image is also larger compared to the secondary images.

Figure 9:
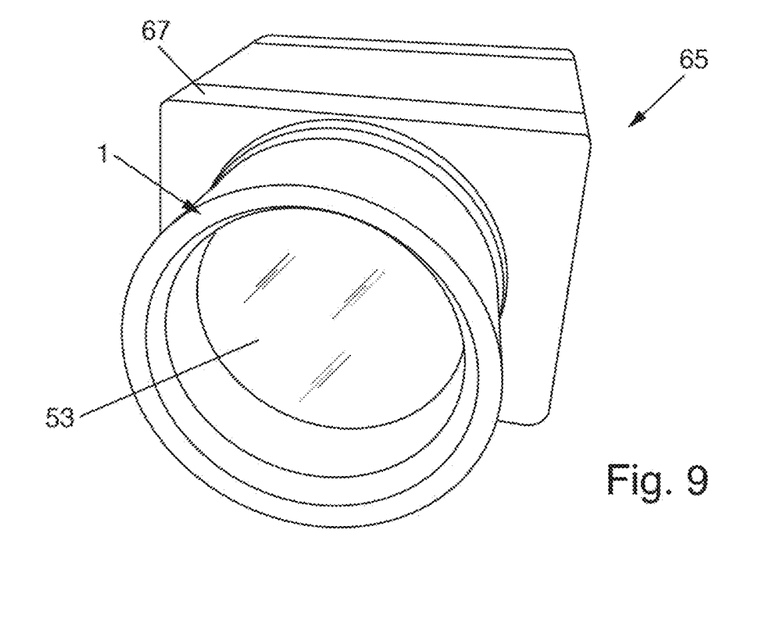
FIG. 9 shows a perspective view of an embodiment of a camera system of the present disclosure comprising the embodiment of an objective of FIG. 1.

In addition, as can further be taken from FIGS. 7 and 9, the embodiment of an objective of the present disclosure comprises an entrance glass or entrance lens 53 arranged in front of the filters 25, 35 forming the primary optical element through which light has to pass before impinging on either a primary or secondary optical package 29, 39.

Moreover, the optical filters 25, 35 are configured such that they have different transmission characteristics, i.e., in the embodiment of an objective of the present disclosure shown the center wavelength and the bandwidth of the transmissive light may vary for different filters 25, 35. In addition, it is also conceivable that the filters 25, 35 are configured such that they are modifying characteristics of the light passing through them in a different manner such as polarization or intensity of the light being transmitted in relation to the incident light. In particular, the filters 25, 35 may include at least two filters 25, 35 that are mutually different with respect to the filter characteristics. However, it is also conceivable, that for any pair of filters 25, 35 the filter characteristics are different.

With regard to the filters 25, 35 it is to be noted that a filter 25, 35 in the sense of the present disclosure may be formed by several individual filter elements being combined to the filter 25, 35, e.g., the filter elements may be stacked one above the other or otherwise combined so as to form the respective filter 25, 35 having the required transmission characteristics.

In particular, in the present embodiment each of the secondary filters 35 is formed as a narrowband filter having a bandwidth of at most 100 nm, preferably at most 70 nm, more preferably at most 50 nm, most preferably at most 30 nm. The transmission wavelength ranges of the secondary filters 35 may be different from each other, preferably at least overlappingly different from each other, i.e., the ranges overlap, or distinctly different from each other, i.e., the ranges do not overlap.

Furthermore, the primary filter 25 is designed as a broadband filter with a bandwidth of at most 600 nm or as a narrowband filter with a bandwidth of at most 100 nm, preferably at most 70 nm, more preferably at most 50 nm, most preferably at most 30 nm. In addition, the wavelength range of the primary filter 35 is different from any of the secondary filters 25, preferably at least overlappingly different or distinctly different from the wavelength ranges of any of the secondary filters 35.

Figure 8:
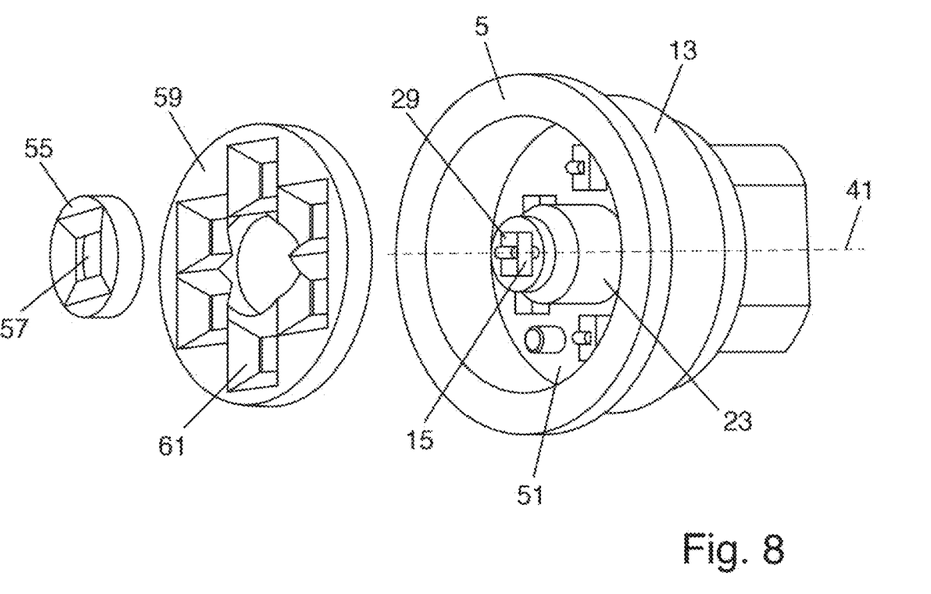
FIG. 8 shows an exploded view of the partition element of the embodiment of FIG. 1.

As shown in FIG. 8, the present embodiment of an objective of the present disclosure further comprises a primary cover element 55, which is aligned with the primary optical package 29, i.e., being placed in front of the optical filter 25 of the primary optical package 29 on the first end face 5 of the partition element 13 on the upstanding portion 23. The primary cover element 55 comprises a primary funnel opening 57, which is coaxially aligned with the optical filter 25, the aperture 15 and the primary lens 27 of the primary optical package 29. In particular, a center of the primary funnel opening 57 coincides with the primary longitudinal axis 41 of the primary optical package 29.

In addition, as also shown in FIG. 8, the embodiment of an objective according to the present disclosure comprises a secondary cover element 59 for the secondary optical packages 39. The secondary cover element 59 is placed on the front face 5 of the partition element 13, and the secondary cover element 59 comprises for each secondary optical package 39 an associated secondary funnel opening 61. Each secondary funnel opening 61 is coaxially aligned with the optical filter 35, the aperture 17 and the secondary lens 37 of the respective secondary optical package 39. Thus, the center of each of the secondary funnel opening 61 coincides with the secondary longitudinal axis 45 of one of the secondary optical packages 39.

The funnel openings 57, 61 in the cover elements 55, 59 prevent light that impinges on the objective from passing through an aperture 15, 17 of the optical packages 25, 35 without also having passed the respective optical filter 25, 35. This in turn has the advantage that disturbances in the signal provided by the image pickup element are further reduced.

Figure 3:
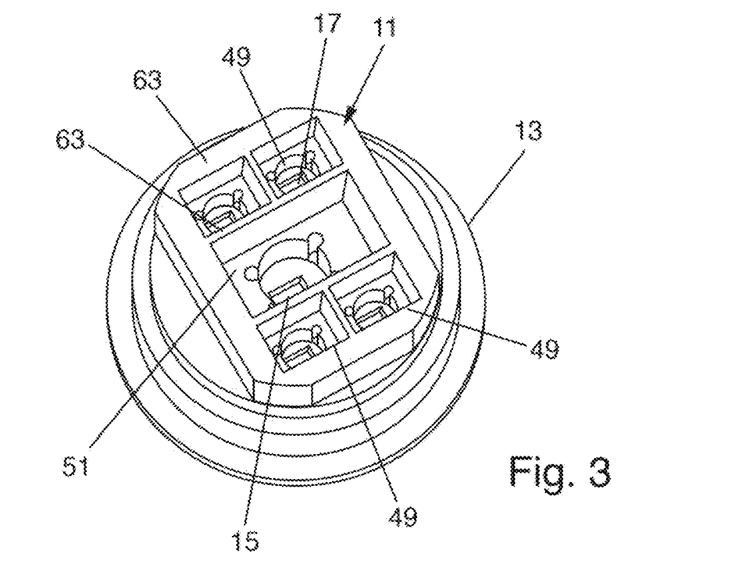
FIG. 3 shows a perspective rear view of the partition element of the embodiment of FIG. 1.

As can be taken from FIGS. 1 and 3, standing walls 63 are formed on the rear side of the partition element 13 and facing the light outlet opening 11. The standing walls 63 extend along the boundaries between the primary and secondary partition sections 51, 49 and parallel to the central longitudinal axis 3. Further, the standing walls 63 are formed by the partition element 13, and can be integrally formed with the partition element 13. The standing walls 63 form for each optical package 29, 39 an associated chamber, which extends from the associated aperture 15, 17 to the light outlet opening 9. Due to the chambers formed by the standing walls 63 light having passed through one of the lenses 27, 37 of one of the optical packages 29, 39 is prevented from being scattered into a region where light from another optical package 29, 39 passes. This prevents that an image generated by light from one optical package 29, 39 is disturbed by light from another optical package 29, 39.

Finally, as can be seen in FIG. 9 the embodiment of an objective according to the present disclosure with its housing 1 may be part of a camera system 65 which in addition to the objective comprises a camera 67 to which the objective is releasably attached.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

| Reference numerals: | |
| --- | --- |
| 1 | housing |
| 3 | central longitudinal axis |
| 5 | first end face |
| 7 | second end face |
| 9 | light inlet opening |
| 11 | light outlet opening |
| 13 | partition element |
| 15 | aperture (primary optical package) |
| 17 | aperture (secondary optical package) |

-continued

| Reference numerals: | |
|---|---|
| 19 | central axis (primary optical package) |
| 21 | central axis (secondary optical package) |
| 23 | upstanding portion |
| 25 | optical filter |
| 27 | primary lens |
| 29 | primary optical package |
| 31 | filter seat |
| 33 | lens seat |
| 35 | optical filter |
| 37 | secondary lens |
| 39 | secondary optical package |
| 41 | primary longitudinal axis |
| 43 | central optical axis (primary lens) |
| 45 | secondary longitudinal axis |
| 47 | central optical axis (secondary lens) |
| 49 | secondary partition section |
| 51 | primary partition section |
| 53 | entrance lens |
| 55 | primary cover element |
| 57 | primary funnel opening |
| 59 | secondary cover element |
| 61 | secondary funnel opening |
| 63 | standing wall |
| 65 | camera system |
| 67 | camera |

What is claimed is:

1. Objective for a camera, comprising:
a housing (1) extending along a central longitudinal axis (3) between a first end face (5) and an opposite second end face (7) and
a partition element (13) located in the housing (1),
wherein the housing (1) has a light inlet opening (9) on the first end face (5) and a light outlet opening (11) on the second end face (7),
wherein the partition element (13) comprises a plurality of partition openings each configured as an aperture (15, 17) and each extending through the partition element (13) along a central axis (19, 21) which is parallel to or coincides with the central longitudinal axis (3) of the housing (1),
wherein an associated optical filter (25, 35) is arranged on each aperture (15, 17), and an associated lens (27, 37) is arranged on each aperture (15, 17), such that for each aperture (15, 17) an optical package (29, 39) is formed by the associated optical filter (25, 35), the respective aperture (15, 17), and the associated lens (27, 37),
wherein one of the optical packages (29, 39) is formed as a primary optical package (29) and the remaining optical packages are formed as secondary optical packages (39), and
wherein the lens (27) of the primary optical package (29) referred to as the primary lens (27) has a greater focal length than each of the lenses (37) of the secondary optical packages (39) referred to as the secondary lenses (37).

2. Objective according to the claim 1, characterized in that the optical filter (25, 35) is arranged in front of each aperture (15, 17) and the associated lens (27, 37) is arranged behind each aperture (15, 17).

3. Objective according to the claim 1, characterized in that the optical filter (25, 35) is arranged behind of each aperture (15, 17) and the associated lens (27, 37) is arranged behind each filter (25, 35).

4. Objective according to claim 1, characterized in that the partition element (13) comprises for each optical package (29, 39) an associated filter seat (31) in which the filter (25, 35) of the respective optical package (29, 39) is seated and/or retained.

5. Objective according to the claim 4, characterized in that the partition element (13) forms each of the filter seats (31).

6. Objective according to claim 4, characterized in that each filter seat (31) is designed as a circumferential step projecting into the partition element (13).

7. Objective according to claim 1, characterized in that the objective comprises for the primary optical package (29) an associated primary cover element (55), which is placed on the first end face (5) of the partition element (13), wherein the primary cover element comprises a primary funnel opening, which is coaxially aligned with the optical filter (25), aperture (15) and/or lens (27) of the primary optical package (29).

8. Objective according to claim 1, characterized in that the objective comprises for the secondary optical packages (39) an associated secondary cover element (59), which is placed on the first end face (5) of the partition element (13), wherein the secondary cover element (59) comprises for each secondary optical package (39) an associated secondary funnel opening (61), which is coaxially aligned with the optical filter (35), aperture (17) and/or lens (37) of the respective secondary optical package (39).

9. Objective according to claim 1, characterized in that the partition element (13) comprises for each optical package (29, 39) an associated lens seat (33) in which the lens (27, 37) of the respective optical package (29, 39) is seated and/or retained.

10. Objective according to the claim 9, characterized in that the partition element (13) forms each of the lens seats (33).

11. Objective according to claim 7, characterized in that each lens seat (33) is designed as a circumferential step projecting into the partition element (13).

12. Objective according to claim 1, characterized in that the objective comprises an entrance glass or entrance lens (53).

13. Objective according to the claim 12, characterized in that the central axis (19) of the aperture (15) of the primary optical package (29) and the central optical axis (43) of the primary lens (27) of the primary optical package (29) are aligned coaxially to define a primary longitudinal axis (41) associated with the primary optical package (29).

14. Objective according to claim 1, characterized in that a primary longitudinal axis (41) of the primary optical package (29) is defined by a central optical axis (43) of the primary lens (27) of the primary optical package (29), wherein the central axis (19) of the aperture (15) of the primary optical package (29) is offset from the primary longitudinal axis (41), preferably offset from the primary longitudinal axis (41) by a predetermined first distance measured in a plane perpendicular to the central longitudinal axis (3) of the housing (1).

15. Objective according to claim 13, characterized in that the primary longitudinal axis (41) coincides with the central longitudinal axis (3) of the housing (1).

16. Objective according to claim 1, characterized in that for each secondary optical package (39) an associated secondary longitudinal axis (45) is defined by a central optical axis (21) of the secondary lens (37) of the secondary optical package (39), wherein for at least one of the secondary optical packages (39) a central axis (21) of the aperture (17) of the at least one secondary optical package (39) is offset from the associated secondary longitudinal axis (45) of the at least one secondary optical package (39), preferably offset from the secondary longitudinal axis (45) by a predetermined second distance measured in a plane perpendicular to the central longitudinal axis (3) of the housing (1).

17. Objective according to claim 16, characterized in that the central axis (21) of the aperture (17) is offset relative to the secondary longitudinal axis (45) towards the central longitudinal axis (3).

18. Objective according to claim 1, characterized in that for each secondary optical package (39) an associated secondary longitudinal axis (45) is defined by a central optical axis (21) of the secondary lens (37) of the secondary optical package (39), wherein for each of the secondary optical packages (39) the secondary longitudinal axis (45) is offset from the central longitudinal axis (3).

19. Objective according to claim 1, characterized in that the objective comprises at least three partition openings, preferably at least four partition openings, more preferred at least five partition openings.

20. Objective according to claim 1, characterized in that at least two of the partition openings have different sizes, in particular different diameter sizes or different open areas.

21. Objective according to claim 1, characterized in that each of the partition openings have a rectangular open area shape.

22. Objective according to claim 1, characterized in that the focal lengths of the lenses (37) of the secondary optical packages (39) are equal.

23. Objective according to claim 1, characterized in that the lenses (37) of the secondary optical packages (39) comprise at least two different focal lengths.

24. Objective according to claim 1, characterized in that each of the secondary filters (35) is formed as a narrowband filter having a bandwidth of at most 100 nm, preferably at most 70 nm, more preferably at most 50 nm, most preferably at most 30 nm.

25. Objective according to claim 1, characterized in that the primary filter (25) is designed as a broadband filter with a bandwidth of at most 600 nm or as a narrowband filter with a bandwidth of at most 100 nm, preferably at most 70 nm, more preferably at most 50 nm, most preferably at most 30 nm.

26. Objective according to claim 1, characterized in that the transmission wavelength ranges of the secondary filters (35) are different from each other, preferably at least overlappingly different from each other or distinctly different from each other.

27. Objective according to claim 1, characterized in that the transmission wavelength range of the primary filter (25) is different from any of the secondary filters (35), preferably at least overlappingly different or distinctly different from the transmission wavelength ranges of any of the secondary filters (35).

28. Objective according to claim 1, characterized in that the partition element (13) comprises an upstanding portion (23) that protrudes towards the first end face (5), wherein the aperture (15) of the primary optical package (29) is formed in the upstanding portion (23) of the partition element (13).

29. Objective according to claim 1, characterized in that the partition element (13) has a number of partition sections (49, 51) corresponding to the number of optical packages (29, 39), wherein in each of the partition sections (49, 51) exactly one of the partition openings (15, 17) is formed, so that exactly one of the optical packages (29, 39) is assigned to each of the partition sections (49, 51), wherein the partition section (51) associated with the primary optical package (29) is designated as the primary partition section (51) and the remaining partition sections are designated as the secondary partition sections (49), and wherein the primary partition section (51) is arranged offset from the secondary partition sections (49) along the central longitudinal axis (3) towards the light inlet opening (9).

30. Objective according to claim 29, characterized in that the primary partition section (51) has a base area perpendicular to the central longitudinal axis (3), referred to as a primary base area, that is at least 1.5 times, preferably at least 2 times, more preferably at least 2.5 times, as large as an average base area of the secondary partition sections (49).

31. Objective according to claim 29, characterized in that the secondary partition sections (49) are arranged without gaps to each other.

32. Objective according to claim 29, characterized in that the primary partition section (51) is arranged in the center of the partition element (13), preferably being aligned with the central longitudinal axis (3).

33. Objective according to claim 29, characterized in that the primary partition section (51) is rectangular in shape, and an equal number of secondary partition sections (49) are respectively arranged to opposite lateral sides of the primary partition section (51).

34. Objective according to claim 29, characterized in that standing walls (63) are formed on the rear side of the partition element (13) facing the light outlet opening (11), wherein the standing walls (63) extend along the boundaries between the partition sections (49, 51).

35. Objective to claim 34, characterized in that the standing walls (63) are formed by the partition element (13), preferably integrally formed with the partition element (13).

36. Objective according to claim 34, characterized in that the standing walls (63) extend parallel to the central longitudinal axis (3) to form an associated chamber for each optical package (29, 39), wherein each chamber extends from the associated aperture (15, 17) to the light outlet opening (11).

37. Objective according to claim 1, characterized in that the primary lens (27) of the primary optical package (29) is configured such that it produces a primary image in a focal plane and each of the secondary lenses (37) of the secondary optical packages (39) are configured such that they produce an associated secondary image in the focal plane.

38. Objective according to claim 37, characterized in that an area of the primary image referred to as a primary image area is at least 1.5 times, preferably at least 2 times, more preferably at least 2.5 times, as large as an average area of the secondary images.

39. Camera system, comprising:
a camera (67), and
an objective according to claim 1,
wherein the objective is attached to the camera (67), in particular detachably, and
wherein the camera (67) has an image pickup device, preferably a sensor, disposed in the image plane of the lenses of the objective.

40. Camera system according to claim 39, wherein the objective is formed according to claim 37 such that the resolution of the primary image is at least 1.5 times, 2 times or 2.5 times of an average resolution of the secondary images.

* * * * *